United States Patent
Chin

(10) Patent No.: US 10,211,859 B2
(45) Date of Patent: Feb. 19, 2019

(54) ADJUSTMENT WORK ASSISTING SYSTEM

(71) Applicant: KYOCERA Document Solutions Inc., Osaka (JP)

(72) Inventor: Bunhaku Chin, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/711,852

(22) Filed: Sep. 21, 2017

(65) Prior Publication Data

US 2018/0091176 A1 Mar. 29, 2018

(30) Foreign Application Priority Data

Sep. 23, 2016 (JP) ................. 2016-185415

(51) Int. Cl.
| | |
|---|---|
| G09G 5/00 | (2006.01) |
| H04B 1/034 | (2006.01) |
| G02B 27/01 | (2006.01) |
| H04B 1/3827 | (2015.01) |

(52) U.S. Cl.
CPC ....... H04B 1/0343 (2013.01); G02B 27/0101 (2013.01); G02B 27/0172 (2013.01); H04B 1/385 (2013.01); G02B 27/017 (2013.01); G02B 2027/014 (2013.01); G02B 2027/0141 (2013.01); G02B 2027/0178 (2013.01); H04B 2001/3866 (2013.01)

(58) Field of Classification Search
CPC .. G02B 27/01; G02B 27/0101; G02B 27/017; G02B 27/0172; G02B 2027/014; G02B 2027/0141; G02B 2027/0178; H04B 1/0343; H04B 1/385; H04B 2001/3866

See application file for complete search history.

(56) References Cited

U.S. PATENT DOCUMENTS

| | | | | |
|---|---|---|---|---|
| 2007/0129914 A1* | 6/2007 | Yano | .................. | G05B 23/0283 702/184 |
| 2010/0177359 A1* | 7/2010 | Miyazaki | ........... | H04N 1/00344 358/406 |
| 2015/0154567 A1* | 6/2015 | Kang | ..................... | G06Q 10/20 705/305 |

(Continued)

FOREIGN PATENT DOCUMENTS

JP 2004-102727 4/2004

*Primary Examiner* — Joe H Cheng

(57) ABSTRACT

A wearable device is worn by a worker who performs adjustment work for an electronic apparatus; and obtains identification information of the electronic apparatus, transmits the obtained identification information to a management server, receives a current setting value of the electronic apparatus from the management server and displays the current setting value to the worker, and receives from the management server work assistance information of the adjustment work corresponding to the obtained identification information and displays the assistance information to the worker. The management server receives the identification information from the wearable device, obtains the current setting value from the electronic apparatus of the identification information and transmits it to the wearable device, and generates the work assistance information that includes a suggestion of a new setting value corresponding to a result of adjustment work and transmits it to the wearable device.

4 Claims, 6 Drawing Sheets

(56) References Cited

U.S. PATENT DOCUMENTS

| | | | |
|---|---|---|---|
| 2016/0132532 A1* | 5/2016 | German | G06F 17/30259 |
| | | | 382/103 |
| 2016/0247177 A1* | 8/2016 | Zamer | G06Q 30/0206 |
| 2016/0291577 A1* | 10/2016 | Yatabe | G05B 15/02 |
| 2017/0061212 A1* | 3/2017 | Tanaka | G06K 9/00671 |
| 2017/0132554 A1* | 5/2017 | Oonishi | G06Q 50/10 |
| 2017/0197302 A1* | 7/2017 | Kobayashi | B25B 23/14 |
| 2017/0206509 A1* | 7/2017 | Beyk | G02B 27/017 |
| 2017/0277758 A1* | 9/2017 | Ishii | G06F 17/30165 |
| 2017/0293544 A1* | 10/2017 | Katayama | G05B 19/0425 |
| 2017/0293896 A1* | 10/2017 | Katayama | G06Q 10/20 |
| 2017/0308344 A1* | 10/2017 | Furihata | G06F 3/0482 |
| 2017/0371325 A1* | 12/2017 | Kodama | G05B 19/41855 |
| 2018/0165629 A1* | 6/2018 | Okamoto | G06Q 10/087 |

* cited by examiner

ADJUSTMENT WORK ASSISTING SYSTEM

CROSS-REFERENCE TO RELATED APPLICATIONS

This application relates to and claims priority rights from Japanese Patent Application No. 2016-185415, filed on Sep. 23, 2016, the entire disclosures of which are hereby incorporated by reference herein.

BACKGROUND

1. Field of the Present Disclosure

The present disclosure relates to an adjustment work assisting system.

2. Description of the Related Art

When manufacturing an electronic apparatus such as a multi function peripheral, after assembling, an adjustment step is carried out on its manufacturing line in order to adjust setting values of sorts of setting items for proper operation of the electronic apparatus.

A technique to adequately change a setting value to obtain a desired result (e.g. printing quality such as printing position) is required to a worker who engages in adjustment work in such an adjustment step, and therefore an expert is favorable for it, but it is favorable that a worker other than an expert can accomplish such adjustment work.

In a work assisting system, a terminal of a worker displays a work procedure and/or a work instruction on a head mounted display of the worker.

In the aforementioned system, it is possible to display a work procedure or the like to a worker and thereby perform work assistance, but when assisting adjustment work of an electronic apparatus for a worker on a manufacturing line in which plural workers wearing wearable devices engage in work for plural electronic apparatuses, it is required to determine an electronic apparatus as a work target of a worker to be assisted, obtain a current setting value from the electronic apparatus, and performs work assistance on the basis of the current setting value. However, the aforementioned system merely provides a fixed work procedure and/or a fixed work instruction to a worker, and therefore hardly performs assistance of the adjustment work based on a status of the electronic apparatus at each time point.

SUMMARY

An adjustment work assisting system according to an aspect of the present disclosure includes a wearable device worn by a worker who performs adjustment work for an electronic apparatus as a work target, and configured to display work assistance information of the adjustment work to the worker; and a management server configured to provide the work assistance information to the wearable device. The wearable device includes a built-in near field wireless communication device, a built-in network interface, and a built-in display device, and (a) obtains identification information of the electronic apparatus from the electronic apparatus using the near field wireless communication device, (b) transmits the obtained identification information of the electronic apparatus to the management server using the network interface, (c) receives from the management server a current setting value of the electronic apparatus corresponding to the obtained identification information and displays the current setting value to the worker using the display device, and (d) receives from the management server work assistance information of the adjustment work corresponding to the obtained identification information of the electronic apparatus and displays the assistance information to the worker using the display device. The management server (a) receives the identification information of the electronic apparatus from the wearable device, (b) obtains the current setting value from the electronic apparatus corresponding to the obtained identification information and transmits the current setting value to the wearable device, and (c) generates the work assistance information that includes a suggestion of a new setting value corresponding to a result of adjustment work performed by the worker on the basis of a history of the past adjustment work and transmits the work assistance information to the wearable device.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
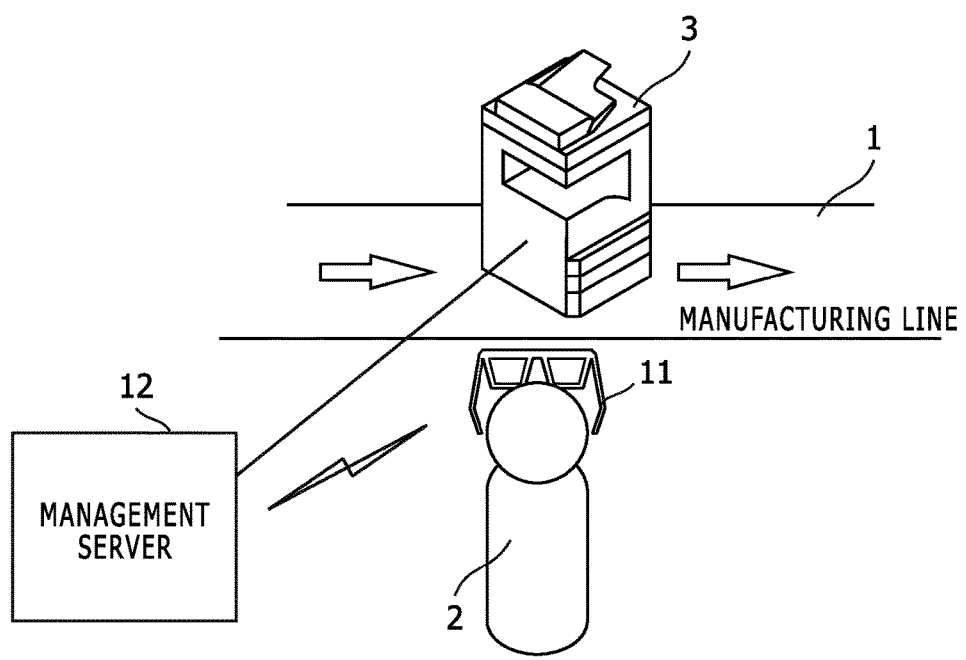
FIG. 1 shows a block diagram that indicates a configuration of an adjustment work assisting system according to an embodiment of the present disclosure.

FIG. 1 shows a block diagram that indicates a configuration of a work assisting system according to an embodiment of the present disclosure. In the work assisting system shown in FIG. 1, a worker 2 is arranged along a manufacturing line, and the worker 2 performs work of an assigned step (here, an adjustment step) for a work target object 3 that is an incomplete electronic apparatus (e.g. an image forming apparatus such as a multi function peripheral) transported on the manufacturing line 1.

The worker 2 performs adjustment work for the work target object 3 in an adjustment step. A wearable device 11 is worn by the worker 2 and displays work assistance information of the adjustment work for the worker 2. Here the work assistance information includes a suggestion of a new setting value to be used for setting value change as the adjustment work. The management server 12 provides the work assistance information to the wearable device 11.

Figure 2:
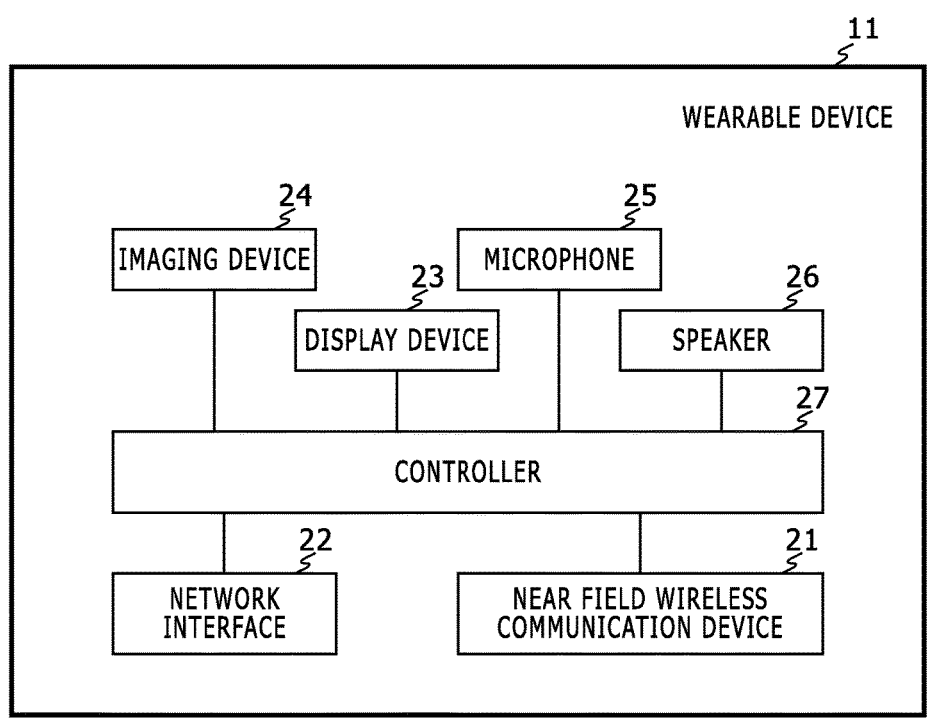
FIG. 2 shows a block diagram that indicates a configuration of a wearable device 11 shown in FIG. 1.

FIG. 2 shows a block diagram that indicates a configuration of the wearable device 11 shown in FIG. 1. The wearable device 11 includes a built-in near field wireless communication device 21, a built-in network interface 22, a built-in display device 23, a built-in imaging device 24, a built-in microphone 25, a built-in speaker 26, and a built-in controller 27.

The near field wireless communication device 21 is a wireless communication device of Bluetooth (registered trademark) or the like, and performs communication with the work target object 3. For example, the near field wireless communication device 21 has a communicable area of about 1 meter or the like with low power, and when plural electronic apparatuses (i.e. work target objects 3) are placed on the manufacturing line 1, the worker 2 approaches one of the work target objects 3 and thereby the near field wireless communication device 21 selectively establishes the communication with the work target object 3 for which the worker 2 should currently perform the adjustment work.

The network interface 22 is a wireless LAN (Local Area Network) interface and is connected to a wireless LAN or the like.

The display device 23 is, for example, a transparent-type head mounted display.

The imaging device 24 includes an image sensor such as a CCD (Charge Coupled Device) and outputs image data of a taken image.

The microphone 25 detects command input by voice from the worker 2. The speaker 26 outputs the work assistance information by voice, a warning sound and the like to the worker 2.

The controller 27 is an ASIC (Application Specific Integrated Circuit), a micro computer that executes a control program, and/or the like, and performs a data process for the adjustment work assistance or the like.

Here, the wearable device 11 is a head mounted type device as one body, and may a combined device of a wearable computer and a head mounted display, for example.

The controller 27 of the wearable device 11 (a) obtains identification information of the work target object 3 from the work target object 3 using the near field wireless communication device 21, (b) transmits the obtained identification information of the work target object 3 to the management server 12 using the network interface 22, (c) receives from the management server 12 a current setting value of the work target object 3 corresponding to the obtained identification information and displays the current setting value to the worker 2 using the display device 23, and (d) receives from the management server 12 work assistance information of the adjustment work corresponding to the obtained identification information of the work target object 3 and displays the assistance information to the worker 2 using the display device 23.

Figure 3:
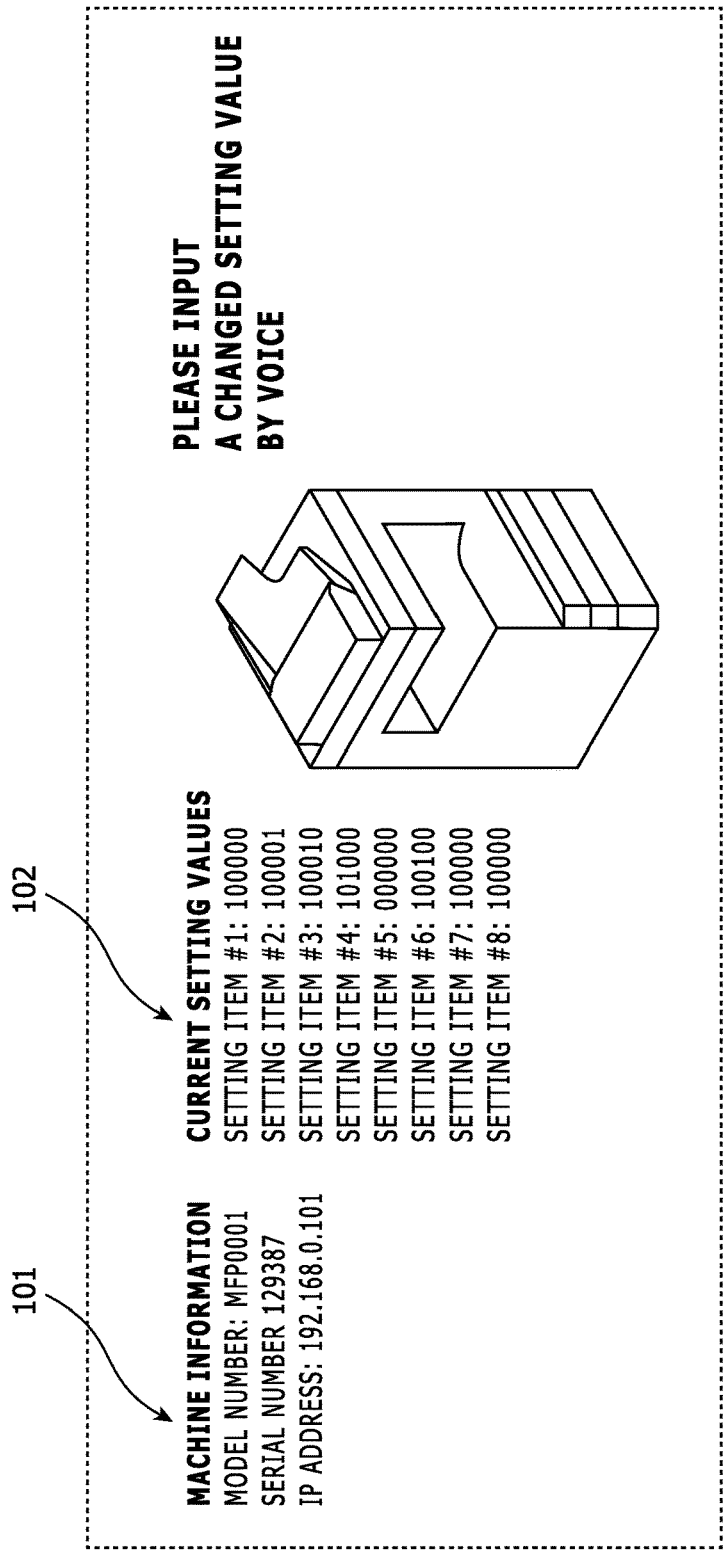
FIG. 3 shows a diagram that indicates an example of current setting values displayed in a sight of a worker 2 by the wearable device 11 in the system shown in FIG. 1.

FIG. 3 shows a diagram that indicates an example of current setting values displayed in a sight of the worker 2 by the wearable device 11 in the system shown in FIG. 1. As shown in FIG. 3, machine information 101 and current setting values 102 of the work target object 3 are displayed, and the worker 2 inputs a new setting value used for setting value change work by his/her voice on the basis of these pieces of the information 101 and 102.

Figure 4:
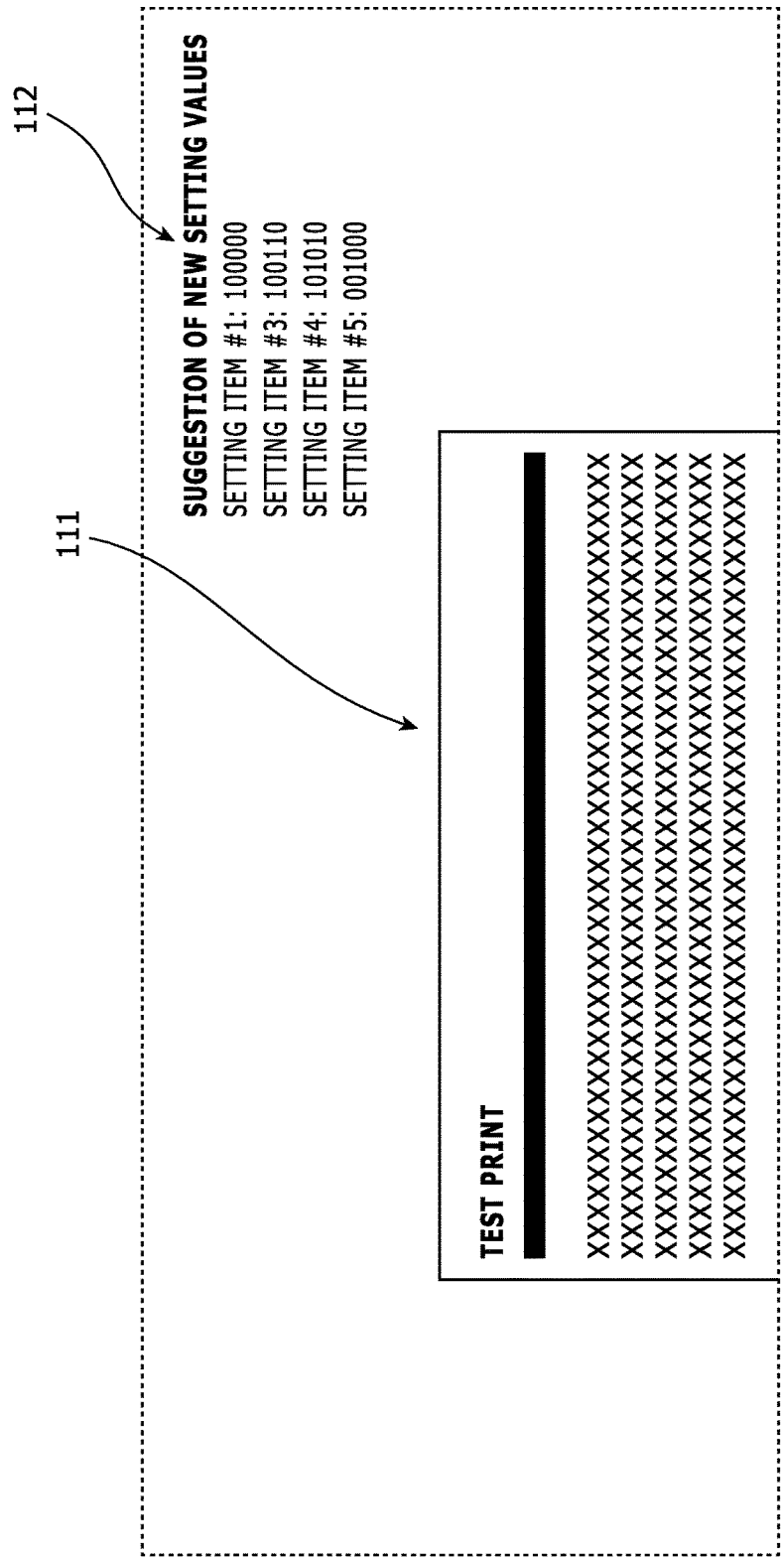
FIG. 4 shows a diagram that indicates an example of a suggestion of new setting values as work assistance information displayed in a sight of a worker 2 by the wearable device 11 in the system shown in FIG. 1.

FIG. 4 shows a diagram that indicates an example of a suggestion of new setting values as work assistance information displayed in a sight of the worker 2 by the wearable device 11 in the system shown in FIG. 1. The worker 2 performs setting value change work for the work target object 3 one time, and subsequently operates the work target object 3 and thereby causes the work target object 3 to print a test printed matter 111 under setting values after the setting value change work, and takes an image of the test printed matter 111 using the imaging device 24. Consequently, this taken image is transmitted to the management server 12, and work assistance information 112 (i.e. a suggestion of a new setting value) is received from the management server 12 and displayed as shown in FIG. 4. Referring this work assistance information 112, the worker 2 performs setting value change work again.

Further, the controller 27 detects command input (input of a new setting value, input of a setting value change command or the like) by voice of the worker 2 using the microphone 25, and when detecting the command input, the controller 27 transmits a request based on the command to the work target object 3. Here, the controller 27 may directly transmit the request to the work target object 3 using the near field wireless communication device 21 or may transmit the request via the management server 12 to the work target object 3 using the network interface 22.

Further, the controller 27 detects imaging command input by voice of the worker 2 using the microphone 25, and when detecting the imaging command input, the controller 27 causes the imaging device 24 to perform an imaging action to take an image and obtains image data of the taken image from the imaging device 24.

The controller 27 causes the imaging device 24 to take images of a test printed matter under current setting values (i.e. setting values before change) and a test printed matter under setting values after change, and transmits to the management server 12 image data that indicates (a) the image of the test printed matter under the current setting values as a pre-change image and (b) the image of the test printed matter under the setting values after change as a post-change image, using the network interface 22.

It should be noted that the work target object 3 is in a status after a physical assembling step, and is enabled to perform a basic action. Therefore, in an adjustment step as a final, using a network interface a near field wireless communication device or the like built in the work target object 3, the wearable device 11 and the management server 12 can perform data communication with the work target object 3.

Further, the management server 12 is installed as capable of data communication with the wearable device 11 of the worker 2 via a wireless LAN or the like. When plural workers 2 are assigned along the manufacturing line 1 and the plural workers 2 are equipped with plural wearable devices 11, respectively, the management server 12 is capable of data communication with the plural wearable devices 11. The management server 12 may be located near the manufacturing line 1 or in a remote place from the manufacturing line 1.

Figure 5:
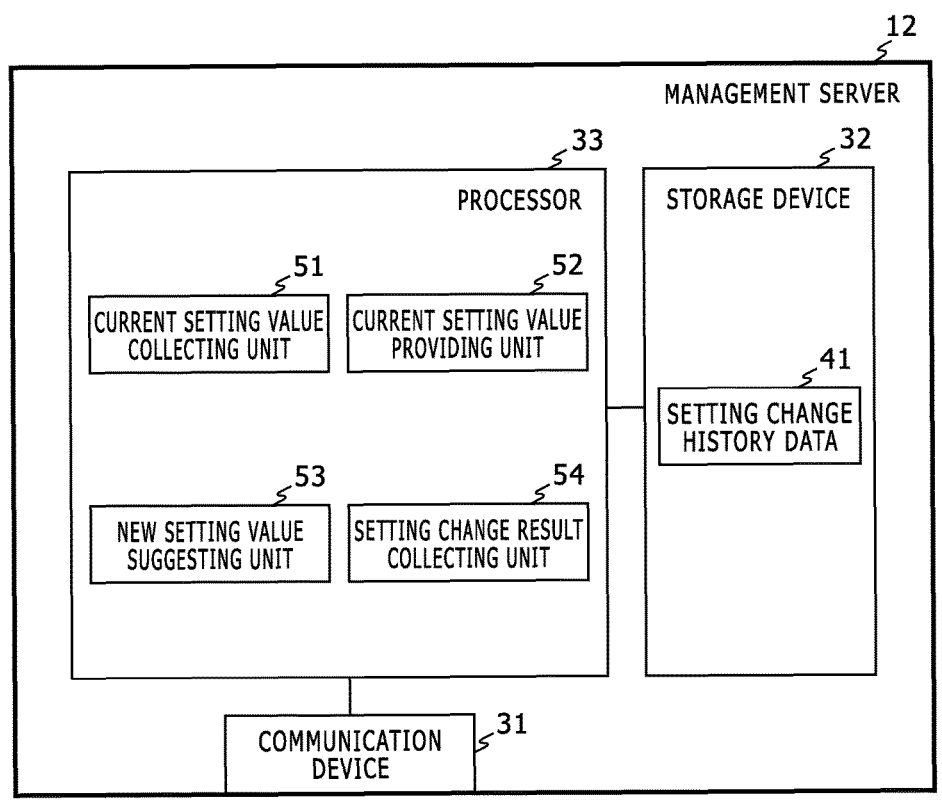
FIG. 5 shows a block diagram that indicates a configuration of a management server 12 shown in FIG. 1.

FIG. 5 shows a block diagram that indicates a configuration of the management server 12 shown in FIG. 1.

The management server 12 is a server computer, for example, in which an operating system, a server program and the like are installed and which has a network communication function.

The management server 12 includes a communication device 31, a storage device 32, and a processor 33.

The communication device 31 is a device that is connected to a network and performs data communication according to a predetermined communication protocol via the network with another device (the work target object 3, the wearable device 11 or the like). As the communication device 31, a network interface, a modem or the like is used.

Further, the storage device 32 is a device capable of storing sorts of data and/or programs. As the storage device 32, a non volatile large capacity storage medium is used such as a non volatile memory or a hard disk. In the storage device 32, setting change history data 41 is stored.

The setting change history data 41 includes a history of past adjustment work performed by plural workers for each machine type of the electronic apparatus (the work target object 3). The history of the past adjustment work includes, for respective plural times of setting value change work sequentially performed in one adjustment step, (a) the setting value before change, (b) the setting value after change, (c) a difference of the setting values before and after change, (d) a difference from a reference value of a predetermined adjustment item under setting values before change, (e) a difference from the reference value of the predetermined adjustment item under setting values after change, and (f) a difference between the differences from the reference value before and after change.

Therefore, when adjusting a predetermined adjustment item to a reference value, a relation between a change amount of a setting value and a decrease or increase amount of a difference from the reference value of the adjustment item is recorded as the history of the past adjustment work.

Further, the processor 33 is a computer which includes a CPU (Central Processing Unit), a ROM (Read Only Memory), a RAM (Random Access Memory) and the like, and loads a program into the RAM from the storage device 32, the ROM or the like and executes the programs by the CPU and thereby acts as sorts of processing units.

Here the processor 33 acts as an unshown operating system, a current setting value collecting unit 51, a current setting value providing unit 52, a new setting value suggesting unit 53, a setting change result collecting unit 54, and the like.

The current setting value collecting unit 51 receives identification information of the work target object 3 from the wearable device 11 via a network using the communication device 31, and obtains a current setting value from the work target object 3 corresponding to the received identification information.

The current setting value providing unit 52 transmits the current setting value of the work target object 3 to the wearable device 11 via a network using the communication device 31.

The new setting value suggesting unit 53 generates work assistance information on the basis of the history of the past adjustment work in the setting change history data 41, and transmits the work assistance information. This work assistance information includes a suggestion of a new setting value to be used for setting value change work.

Specifically, the new setting value suggesting unit 53 (a) receives the image data of the aforementioned pre-change image and the aforementioned post-change image via a network from the wearable device 11 using the communication device 31, (b) determines a value of a predetermined adjustment item in the pre-change image and determines as a first difference on the basis of the image data a difference between the determined value and a reference value of the adjustment item under current setting values, (c) determines a value of the predetermined adjustment item in the post-change image and determines as a second difference on the basis of the image data a difference between the determined value and a reference value of the adjustment item under current setting values, (d) generates on the basis of the aforementioned history the work assistance information that includes a suggestion of a new setting value corresponding to (d1) the setting value before change, (d2) the setting value after change, (d3) a difference of the setting values before and after change, (d4) the first difference, (d5) the second difference, and (d6) a difference between the first difference and the second difference, and transmits the work assistance information to the wearable device 11.

Here, the predetermined adjustment item is "printing position" or "printing color".

The printing position means a position of a test pattern in a printing paper sheet. If the predetermined adjustment item is "printing position", then, for example, the setting items to be adjusted includes a transportation speed of a printing paper sheet, a margin from a synchronization signal (BD signal) of an LSU (Laser Scanning Unit) and/or the like. If the predetermined adjustment item is "printing position", then differences of positions in a primary scanning direction and a secondary scanning direction of the test pattern are detected as the aforementioned first difference or the aforementioned second difference. Amounts of the first difference and the second difference are derived on the basis of a ratio to a size (e.g. vertical size or horizontal size) of a standard printing paper sheet.

Further, the printing color means a color (e.g. RGB color) of a test pattern on a printing paper sheet. If the predetermined adjustment item is "printing color", then, for example, the setting items to be adjusted includes densities of respective toner colors and the like. If the predetermined adjustment item is "printing color", then a difference of a color of a test pattern (e.g. a color difference from a reference color) is detected as the aforementioned first difference or the aforementioned second difference.

Further, specifically, between the history of the past adjustment work in the setting change history data 41 and the aforementioned image data (the pre-change image and the post-change image) received from the wearable device 11, the new setting value suggesting unit 53 determines in the history the setting change work of which (a) the setting value before change, (b) the setting value after change, (c) the difference of the setting values between before and after change, (d) the first difference, (e) the second difference and (f) the difference of the first difference and the second difference agree within a predetermined error range, and generates the work assistance information that includes a suggestion of a new setting value that is a sum of differences of the setting values between before and after change from the determined setting change work to the last setting change work in the adjustment step (one adjustment step), and transmits the work assistance information to the wearable device 11.

For example, if the setting value before change is 1.0, the setting value after change is 1.2, the difference of the setting values between before and after change is 0.2, the first and the second differences of the printing position are 5 millimeters and 2 millimeters on the basis of the pre-change image and the post-change image from the wearable device 11, and the difference between the first and the second differences is −3 millimeters, and the history of the past adjustment work in one adjustment step in the setting change history data 41 is (0.7, 1.0, 0.3, 11 mm, 5 mm, −6 mm), (1.0, 1.2, 0.2, 5 mm, 2 mm, −3 mm), (1.2, 1.3, 0.1, 2 mm, 1 mm, −1 mm), and (1.3, 1.4, 0.1, 1 mm, 0 mm, −1 mm) in the format of (Setting value before change, Setting value after change, Difference of these setting values, First difference, Second difference, Difference of these differences), then 1.4 as a setting value after the last adjustment work is suggested as a new setting value. It should be noted that for simple explanation change of one setting value is explained but actually, plural setting values are changed adequately. In addition, if a new setting value to be suggested is not determined on the basis of the setting change history data 41, then this result is informed to the wearable device 11 and displayed to the worker 2.

For each of plural times of setting value change work sequentially performed in one adjustment step, the setting change result collecting unit 54 determines (a) a setting value before change, (b) a setting value after change, (c) a difference of the setting values between before and after change, (d) an aforementioned first difference, (e) an aforementioned second difference, and (f) a difference between the first and the second differences, and adds them to the history of past adjustment work in the setting change history data 41.

For the difference of the setting values between before and after change, the setting value after change is obtained from the work target object 3 or the wearable device 11, and then the difference of the setting values between before and after change is determined.

Figure 6:
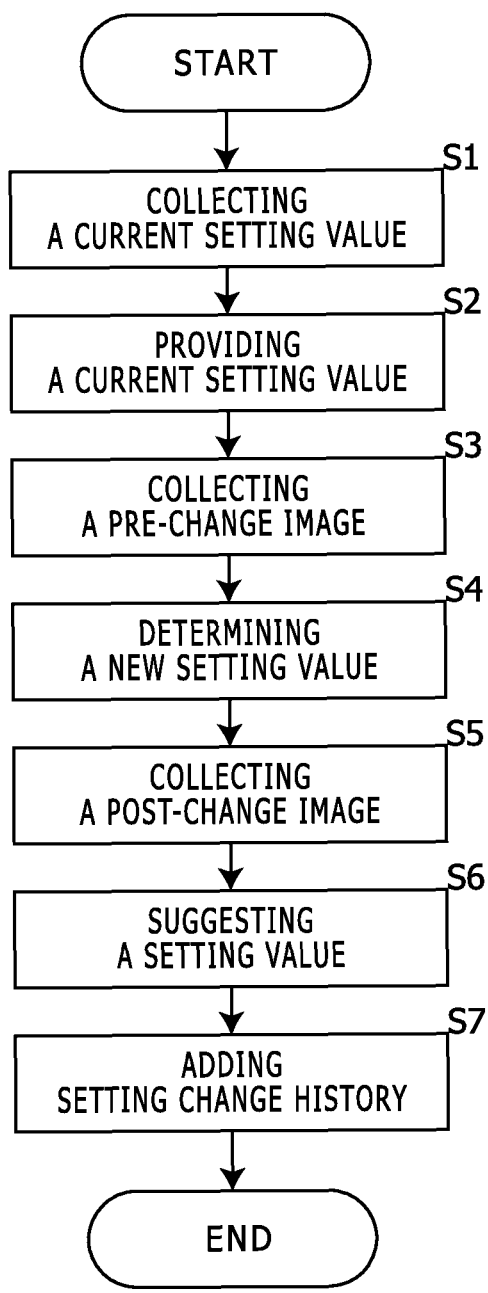
FIG. 6 shows a flowchart that explains a behavior of the management server 12 in the adjustment work assisting system shown in FIG. 1.

The following part explains the aforementioned adjustment work assisting system. FIG. 6 shows a block diagram that indicates a configuration of an adjustment work assisting system according to an embodiment of the present disclosure.

Firstly, the worker 2 wears the wearable device 11 and approaches a work target object 3. Consequently, the wearable device 11 obtains identification information from the work target object 3 using the near field wireless communication device 21, and transmits the identification information to the management server 12 using the network interface 22. When receiving the identification information, the management server 12 identifies an electronic apparatus (i.e. work target object 3) of the identification information, and obtains current setting values from the identified work target object 3 (in Step S1).

Subsequently, the management server 12 transmits the obtained current setting values to the wearable device 11 that is a sender of the identification information (in Step S2).

When receiving the current setting values of the work target object 3 from the management server 12, the wearable device 11 displays the current setting values to the worker 2 using the displays device 23, for example, as shown in FIG. 3.

The worker 2 operates the work target object 3 to cause it to print a test printed matter under the current setting values, and causes the wearable device 11 to take an image of this test printed matter. The wearable device 11 transmits image data of the taken image (i.e. the pre-change image) to the management server 12. The management server 12 receives image data of the pre-change image and maintains the received image data (in Step S3).

Afterward, the worker 2 inputs a new setting value to the wearable device 11 by his/her voice and thereby updates a setting value of the work target object 3 with the inputted new setting value. Subsequently, the management server 12 determines the new setting value (i.e. the setting value after change) (in Step S4).

After the change of the setting value, the worker 2 operates the work target object 3 to cause it to print a test printed matter under setting values after the change, and causes the wearable device 11 to take an image of this test printed matter. The wearable device 11 transmits image data of the taken image (i.e. the post-change image) to the management server 12. The management server 12 receives image data of the post-change image and maintains the received image data (in Step S5).

Subsequently, the management server 12 determines (a) a setting value before the change, (b) a setting value after the change, (c) a difference of the setting values between before and after the change, (d) a difference from a reference value of an adjustment item before the change (i.e. a first difference), (e) a difference from the reference value of the adjustment item after the change (i.e. a second difference), (f) a difference between the first and the second differences; and determines a new setting value to be suggested on the basis of these values by referring the setting change history data 41, and transmits work assistance information that includes the determined setting value to the wearable device 11 (in Step S6). The wearable device 11 receives the work assistance information and displays it to the worker 2 using the display device 23. The worker 2 performs setting value change work again by referring the work assistance information (i.e. a suggestion of a new setting value). In such manner, an effective setting value is suggested on the basis of past setting value change work, and therefore, the number of times of the setting value change work can be reduced.

Further, the management server 12 adds (a) the difference of the setting values between before and after the change and (b) the difference of the differences from the reference value of the adjustment item between before and after the change, as a record, to the setting change history data 41 (in Step S7). Consequently, the history of the setting value change work is accumulated, and thereby an effective setting change is suggested.

As mentioned, in the aforementioned embodiment, the wearable device 11 includes the built-in near field wireless communication device 21, the built-in network interface 22 and the built-in display device 23, and (a) obtains identification information of the work target object 3 from the work target object 3 using the near field wireless communication device 21, (b) transmits the obtained identification information of the work target object 3 to the management server 12 using the network interface 22, (c) receives from the management server 12 a current setting value of the work target object 3 corresponding to the obtained identification information and displays the current setting value to the worker 2 using the display device 23, and (d) receives from the management server 12 work assistance information of the adjustment work corresponding to the obtained identification information of the work target object 3 and displays the assistance information to the worker 2 using the display device 23; and the management server 12 (a) receives the identification information of the work target object 3 from the wearable device 11, (b) obtains the current setting value from the work target object 3 corresponding to the obtained identification information and transmits the current setting value to the wearable device 11, and (c) generates the work assistance information that includes a suggestion of a new setting value corresponding to a result of adjustment work performed by the worker 2 on the basis of a history of the past adjustment work and transmits the work assistance information to the wearable device 11.

Consequently, assistance of adjustment work is adequately performed for each worker 2 who wears a wearable device 11.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An adjustment work assisting system, comprising:
a wearable device worn by a worker who performs adjustment work for an electronic apparatus as a work target, and configured to display work assistance information of the adjustment work to the worker; and
a management server configured to provide the work assistance information to the wearable device;
wherein the wearable device comprises a built-in near field wireless communication device, a built-in network interface, and a built-in display device, and (a) obtains identification information of the electronic apparatus from the electronic apparatus using the near field wireless communication device, (b) transmits the obtained identification information of the electronic apparatus to the management server using the network interface, (c) receives from the management server a current setting value of the electronic apparatus corresponding to the obtained identification information and displays the current setting value to the worker using the display device, and (d) receives from the management server work assistance information of the adjustment work corresponding to the obtained identification information of the electronic apparatus and displays the assistance information to the worker using the display device; and
the management server (a) receives the identification information of the electronic apparatus from the wearable device, (b) obtains the current setting value from the electronic apparatus corresponding to the obtained identification information and transmits the current setting value to the wearable device, and (c) generates the work assistance information that includes a suggestion of a new setting value corresponding to a result of adjustment work performed by the worker on the basis of a history of the past adjustment work and transmits the work assistance information to the wearable device.

2. The adjustment work assisting system according to claim 1, wherein
the wearable device further comprises a built-in imaging device, and takes images of a test printed matter at the current setting value and at a new setting value using the imaging device, and transmits to the management server image data that indicates (a) the image of the test printed matter at the current setting value as a pre-change image and (b) the image of the test printed matter at the new setting value as a post-change image; and
the management server (a) receives the image data, (b) determines a value of a predetermined adjustment item in the pre-change image and determines as a first difference on the basis of the image data a difference between the determined value and a reference value of the adjustment item under current setting values, (c) determines a value of the predetermined adjustment item in the post-change image and determines as a second difference on the basis of the image data a difference between the determined value and a reference value of the adjustment item under current setting values, (d) generates on the basis of the history the work assistance information that includes a suggestion of a new setting value corresponding to (d1) the setting value before change, (d2) the setting value after change, (d3) a difference of the setting values before and after change, (d4) the first difference, (d5) the second difference, and (d6) a difference between the first difference and the second difference, and transmits the work assistance information to the wearable device.

3. The adjustment work assisting system according to claim 2, wherein the predetermined adjustment item is a printing position or a printing color.

4. The adjustment work assisting system according to claim 2, wherein
the history of the past adjustment work includes, for respective plural times of setting value change work sequentially performed in one adjustment step, (a) differences of the setting value between before and after change and (b) differences of the first difference and the second difference; and
the management server determines (a) in the history the setting change work of which the difference of the setting values between before and after change and the difference of the first difference and the second difference agree within a predetermined error range with the difference of the setting values between before and after change and the difference of the first difference and the second difference of the image data received from the wearable device, and (b) generates the work assistance information that includes a suggestion of a new setting value that is a sum of differences of the setting values between before and after change from the determined setting change work to a last setting change work in the one adjustment step, and transmits the work assistance information to the wearable device.

* * * * *